United States Patent [19]

Gregory et al.

[11] Patent Number: 5,843,218

[45] Date of Patent: Dec. 1, 1998

[54] BISAZO INKJET DYES

[75] Inventors: Peter Gregory; Prahalad Manibhai Mistry; Roy Bradbury; Paul Wight, all of Manchester, United Kingdom

[73] Assignee: Zeneca Limited, London, England

[21] Appl. No.: 947,865

[22] Filed: Oct. 9, 1997

[30] Foreign Application Priority Data

Oct. 11, 1996 [GB] United Kingdom ............ 962225

[51] Int. Cl.⁶ .................... C09D 11/02; C09B 31/08
[52] U.S. Cl. ................... 106/31.52; 106/31.48; 106/31.58; 534/825; 427/466; 428/195
[58] Field of Search ............. 106/31.52, 31.48, 106/31.58; 534/825; 427/466; 428/195

[56] References Cited

U.S. PATENT DOCUMENTS

| | | | |
|---|---|---|---|
| 4,963,189 | 10/1990 | Hindagolla | 106/31.52 |
| 5,053,495 | 10/1991 | Greenwood | 534/829 |
| 5,055,566 | 10/1991 | Gregory | 106/31.52 |
| 5,062,893 | 11/1991 | Adamic | 534/228 |
| 5,177,195 | 1/1993 | Gregory et al. | 106/31.52 |
| 5,203,912 | 4/1993 | Greenwood et al. | 106/31.52 |
| 5,256,194 | 10/1993 | Nishiwaki et al. | 106/31.52 |
| 5,370,730 | 12/1994 | Gregory et al. | 106/31.52 |
| 5,439,517 | 8/1995 | Yoshida et al. | 106/31.52 |
| 5,451,251 | 9/1995 | Mafune et al. | 106/31.52 |
| 5,647,897 | 7/1997 | Ouki et al. | 106/31.52 |

FOREIGN PATENT DOCUMENTS

| | | |
|---|---|---|
| 0 249 127 A2 | 6/1986 | European Pat. Off. . |
| 0 565 286 A1 | 10/1993 | European Pat. Off. . |
| WO 96/13553 | 5/1996 | WIPO . |

OTHER PUBLICATIONS

Chemical Abstract, vol. 123:317161 (JP 07109429 A2), Apr. 1995.

*Primary Examiner*—Helene Klemanski
*Attorney, Agent, or Firm*—Pillsbury Madison & Sutro LLP

[57] ABSTRACT

A bisazo dye of Formula (1) and salts thereof:

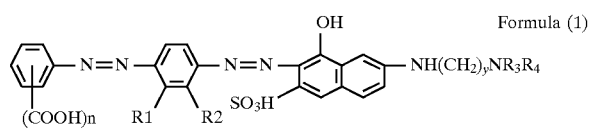

wherein:

$R_1$ and $R_2$ together with the carbon atoms to which they are attached form a 5- or 6- membered carbocyclic ring which is optionally substituted by $SO_3H$;

$R_3$ and $R_4$ are each independently H or $C_{1-4}$-alkyl;

y is 1, 2, 3 or 4; and n is 1, 2 or 3.

The dyes are useful for ink jet printing.

12 Claims, No Drawings

BISAZO INKJET DYES

The present invention relates to bisazo dyes, to inks and to their use in inkjet printing.

Inkjet printing is a non-impact printing technique which involves ejecting, thermally or by action of an oscillating piezo crystal, droplets of ink continuously or on demand from a fine nozzle directly onto a substrate.

According to the present invention there is provided a bisazo dye of Formula (1) and salts thereof:

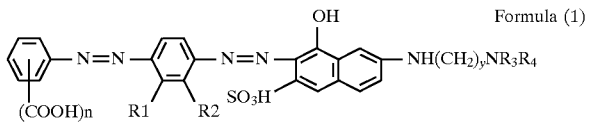

wherein:

$R_1$ and $R_2$ together with the carbon atoms to which they are attached form a 5- or 6- membered carbocyclic ring which is optionally substituted by $SO_3H$;

$R_3$ and $R_4$ are each independently H or $C_{1-4}$-alkyl;

y is 1, 2, 3 or 4; and n is 1, 2 or 3.

The dyes of Formula (1) may be in the free acid form as shown but are preferably in the form a salt, more preferably in the form of a water-soluble salt. Preferred water-soluble salts are those with alkali metals, e.g. Li, Na or K salts, and ammonium or substituted ammonium salts. Especially preferred salts are those with volatile amines or ammonia.

Preferred dyes of Formula (1) are those in which $R_3$ and $R_4$ are methyl or ethyl. Preferably y is 2 or 3.

Preferably $R_1$ and $R_2$ together with the carbon atoms to which they are attached form a benzene ring which is optionally substituted by $SO_3H$.

A preferred dye is of the following formula or a salt thereof:

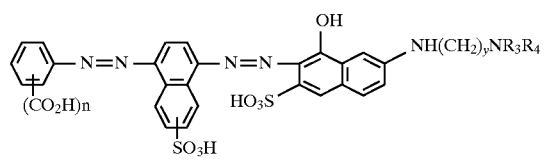

wherein n, y, $R_3$ and $R_4$ are as hereinbefore defined.

The dyes of Formula (1) may be prepared by methods analogous to those described in the art for similar azo compounds. Thus, for example, a suitable method comprises:

i) diazotising an aromatic amine of Formula (2):

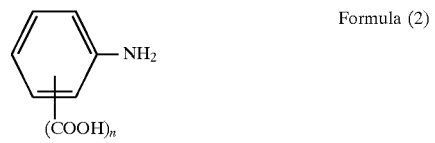

to form the corresponding diazonium salt and coupling onto a compound of Formula (3):

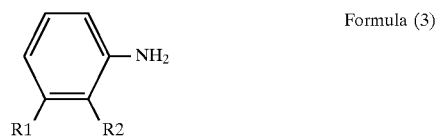

to form a compound of Formula (4):

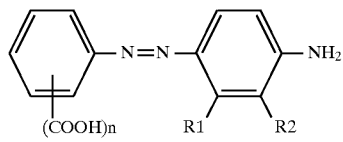

ii) diazotising the compound of Formula (4) and coupling onto a compound of Formula (5):

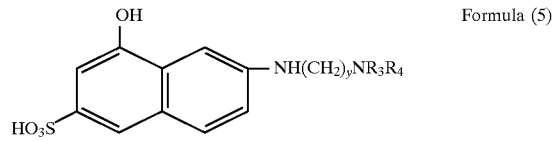

to form the compound of Formula (1). In this process $R_1$, $R_2$, $R_3$, $R_4$, N and y are as hereinbefore defined.

The reactions leading to the formation of the present compounds may be performed under conditions that have been described in the art and the bisazo dyes may be isolated by known methods such as spray drying or precipitation followed by filtration.

According to a further feature of the present invention there is provided an ink composition comprising a bisazo dye of Formula (1) or salts thereof and a medium.

The present ink composition may comprise a mixture of two or more different dyes of Formula (1) or salts thereof or may comprise a mixture of one or more dyes of Formula (1) or salts thereof with one or more other dyes such as other azo dyes.

The medium for the present ink compositions may be a liquid or a low melting point solid. Liquid media may be aqueous or solvent-based. Aqueous-based ink compositions are generally used in office or home printers whereas solvent based ink compositions find use in industrial continuous printers.

It is preferred that the dye of Formula (1) is dissolved completely in the aqueous or solvent medium to form a solution.

Preferred ink compositions are those comprising a bisazo dye of Formula (1) and an aqueous medium.

The present bisazo dyes are particularly useful as colorants for aqueous inks. They exhibit high solubility in water and in aqueous media, high water fastness, rapid fixation on paper and attractive black shades.

The ink compositions of the present invention preferably contain from 0.5% to 20%, more preferably from 0.5% to 15%, and especially from 1% to 3%, by weight of the dye of Formula (1) based on the total weight of the ink. Although many ink compositions contain less than 5% by weight of colorant, it is desirable that the dye has a solubility of around 10% or more to allow the preparation of concentrates which may be used to prepare more dilute inks and to minimise the chance of precipitation of colorant if evaporation of the liquid medium occurs during use of the ink.

Where the liquid medium is aqueous based it is preferably water or a mixture of water and one or more water-soluble organic solvent, more preferably a mixture comprising water and from 1 to 10 water-miscible organic solvents. The weight ratio of water to organic solvent(s) is preferably from 99:1 to 1:99, more preferably from 99:1 to 50:50 and especially from 95:5 to 80:20. The water-soluble organic solvent(s) is preferably selected from $C_{1-4}$-alkanols such as methanol, ethanol, n-propanol, isopropanol, n-butanol, sec-butanol, tert-butanol, isobutanol or n-pentanol; amides such as dimethylformamide or dimethylacetamide; ketones or ketone-alcohols such as acetone or diacetone alcohol; ethers such as tetrahydrofuran or dioxane; oligo- or poly-alkyleneglycols such as diethylene glycol, triethylene glycol, hexylene,glycol, polyethylene glycol or polypropylene glycol; alkyleneglycols or thioglycols containing a $C_2$–$C_6$-alkylene group such as ethylene glycol, propylene glycol, butylene glycol, pentylene glycol or hexylene glycol and thiodiglycol; polyols such as glycerol or 1,2,6-hexanetriol; $C_{1-4}$ -alkyl-ethers of polyhydric alcohols such as 2-methoxyethanol, 2-(2-methoxyethoxy)ethanol, 2-(2-ethoxyethoxy)-ethanol, 2-[2-(2-methoxyethoxy)ethoxy] ethanol, 2-[2-(2-ethoxyethoxy)-ethoxy]-ethanol, ethyleneglycolmonoallylether; heterocyclic ketones, such as 2-pyrrolidone, N-methyl-2-pyrrolidone, N-ethyl-2-pyrrolidone and 1,3-dimethylimidazolidone; sulphoxides such as dimethyl sulphoxide and sulpholane or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-pyrrolidone; alkylene- and oligo-alkylene-glycols, such as ethyleneglycol, diethyleneglycol, triethyleneglycol; and lower alkyl ethers of polyhydric alcohols such as or 2-methoxy-2-ethoxy-2-ethoxyethanol; and polyethyleneglycols with a molecular weight of up to 500. A preferred specific solvent mixture is a binary or ternary mixture of water and diethylene glycol and/or, 2-pyrrolidone or N-methylpyrrolidone in weight ratios 75-95:25-5 and 60-80:0-20:0-20 respectively.

Examples of suitable ink media are given in U.S. Pat. No. 4,963,189, U.S. Pat. No. 4,703,113, U.S. Pat. No. 4,626,284 and EP 4,251,50A.

According to a further aspect of the present invention there is provided a process for printing a substrate with an ink composition using an ink-jet printer, characterised in that the ink composition comprises at least one dye of Formula (1) or salt thereof.

A suitable process for the application of an ink composition as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

The substrate used in the inkjet printing process may be paper, plastics, textile, metal or glass and is preferably paper, plastic or a textile material, especially a natural, semi-synthetic or synthetic material.

Examples of natural textile materials include wool, silk, hair and cellulosic materials, particularly cotton, jute, hemp, flax and linen.

Examples of synthetic and semi-synthetic materials include polyamides, polyesters, polyacrylonitriles and polyurethanes.

Preferred substrates include overhead projector slides or papers, including plain and treated papers, which may have an acid, alkaline or neutral character or textile materials such as cotton. An especially preferred substrate is paper.

The preferred ink compositions used in the process are as hereinbefore described.

According to a further aspect of the present invention there is provided a paper or an overhead projector slide or textile material printed with an ink composition characterised in that the ink composition comprises at least one dye of Formula (1) or salt thereof.

Where the liquid medium is solvent based the solvent is preferably selected from ketones, alkanols, aliphatic hydrocarbons, esters, ethers, amides or mixtures thereof. Where an aliphatic hydrocarbon is used as the solvent a polar solvent such as an alcohol, ester, ether or amide is preferably added. Preferred solvents include ketones, especially methyl ethyl ketone and alkanols especially ethanol and n-propanol.

Solvent based ink compositions are used where fast drying times are required and particularly when printing onto hydrophobic substrates such as plastics, metal or glass.

Where the medium for an ink composition is a low melting point solid the melting point of the solid is preferably in the range from 60° C. to 125° C. Suitable low melting point solids include long chain fatty acids or alcohols, preferably those with $C_{18-24}$ chains, or sulphonamides. The dye of Formula (1) or mixtures of dyes of Formula (1) may be dissolved in the low melting point solid or may be finely dispersed in it.

According to a further aspect of the present invention there is provided a process for the coloration of a textile material with any of the abovementioned ink compositions which comprises the steps:

i) applying the ink composition to the textile material by inkjet printing; and ii) heating the textile material at a temperature from 50° C. to 250° C. to fix the dye on the material.

The process for coloration of a textile material by inkjet printing preferably comprises a pre-treatment of the textile material with an aqueous pretreatment composition comprising a water-soluble base, a hydrotropic agent and a thickening agent followed by removing water from the pre-treated textile material to give a dry pre-treated textile material which is subjected to inkjet printing in step i) above.

The pretreatment composition preferably comprises a solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pretreatment to promote the dyeing of the pretreated textile material. Where the base is sodium bicarbonate it is convenient to use a concentration of from 1% to 5% by weight based on the total weight of the composition.

The hydrotropic agent is present to provide sufficient water to promote the fixation reaction between the dye and the textile material during the heat treatment, in step (d) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pretreatment composition.

The remainder of the pretreatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL FC-PN (available from ICI), which have a strong affinity for the textile material and the dye and thus increase the fixation of the dye on the textile material.

Examples of anti-migration agents are low molecular weight acrylic resins, e.g. polyacrylates, such as poly(acrylic acid) and poly(vinyl acrylate).

In the pretreatment stage of the present process the pretreatment composition is preferably evenly applied to the textile material. Where a deeply penetrated print or a deep shade is required the pretreatment composition is preferably applied by a padding or similar process so that it is evenly distributed throughout the material. However, where only a superficial print is required the pretreatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Examples of suitable humectants are, propan-1,2-diol, butan-1,2-diol, butan-2,3-diol and butan-1,3-diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pretreated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes. If a steam (wet) heat treatment is used, the printed material is preferably maintained at 100–105° C. for from 5 to 15 minutes whereas if a dry heat treatment is employed the printed material is preferably maintained at 140–160° C. for from 2 to 8 minutes.

After allowing the textile material to cool, unfixed dye and other ingredients of the pretreatment and dye compositions may be removed from the textile material by a washing sequence, involving a series of hot and cold washes in water and aqueous detergent solutions before the textile material is dried.

According to further aspects of the present invention there are provided textile materials, especially cellulosic textile materials, coloured with any of the ink compositions according to the present invention or by means of the process according to the present invention.

The invention is further illustrated by the following Examples in which all parts and percentages are by weight unless otherwise stated.

The following examples are of Formula (6) wherein $R_6$, $R_7$, $R_3$, $R_4$, n and y are as defined below:

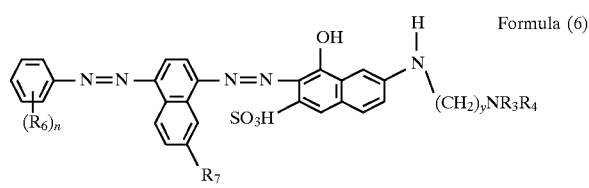

Formula (6)

EXAMPLE 1

Preparation of a dye of Formula (6) in which n=2, $R_6$=3,5-diCOOH, $R_7$=$SO_3H$, y=2, $R_3$ and $R_4$=$CH_3$.

5-Aminoisophthalic acid (36.2 g) is added to water (1l) and the pH adjusted to 8 by addition of sodium hydroxide solution. Sodium nitrite (15.2 g) is then added and the solution poured over 5 mins into a stirred mixture of ice (100 g), water (100 g) and hydrochloric acid (50 cm³) keeping the temperature at 0–10° C. After stirring for 2 hrs excess nitrous acid is destroyed by sulphamic acid and a solution of 1-aminonaphthalene-7-sulphonic acid (44.6 g) in water (500 cm³) at pH10 added below 10° C. Following dilution with water to a volume of ca 2.5 litres stirring is continued for several hours at room temperature. The product is isolated by filtration, washed with water and dried at 70° C. to give a product having the following structure:

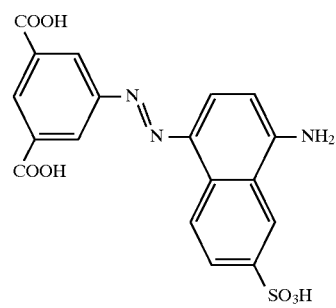

The monoazo product (62.6 g) is added to water (500 cm³) and the pH adjusted to 9 with sodium hydroxide solution. After screening, sodium nitrite (5.32 g) is added and the solution poured into a mixture of ice (50 g), water (50 g) and hydrochloric acid (25 g) keeping the temperature at 0–10° C. After stirring for 3 hrs excess nitrous acid is destroyed by sulphamic acid.

7-(2-dimethylaminoethyl)amino-3-sulphonaphth-1-ol is stirred in water (500 cm$^3$) at 0–10° C. and the pH adjusted to 10 by addition of sodium hydroxide. The above prepared diazonium salt suspension is slowly added at 0–10° C. maintaining the pH at 9.5–10. After stirring for several hours at room temperature the solution is heated to 60° C. and ammonium chloride (140 g) added. The pH is slowly adjusted to 6 with hydrochloric acid and the product isolated by filtration at 60° C. and washed with ammonium chloride solution (15%w/v, 1 l). The filter cake is dissolved in water (1 l) by the addition of ammonia solution, heated to 70° C. and ammonium chloride (150 g) added. The pH is slowly adjusted to 1 with hydrochloric acid and the product again isolated by filtration at 70° C. washing with dilute hydrochloric acid (1 l). This procedure is carried out twice more before finally suspending the product in water (1 l) and adding ammonia solution until a homogeneous solution is obtained. The solution is dialysed to low conductivity and the product isolated by evaporation of the water to give the desired product.

EXAMPLE 2

Preparation of a dye of Formula (6) in which n=2, $R_6$=3,5-diCOOH, $R_7$=H, y=2, $R_3$ and $R_4$=CH$_3$.

Prepared in analogous manner to Example 1 replacing 1-aminonaphthalene-7-sulphonic acid by 1-aminonaphthalene (as a solution in ethanol).

EXAMPLE 3

Preparation of a dye of Formula (6) in which n=1, $R_6$=3-COOH, $R_7$=SO$_3$H, y=2, $R_3$ and $R_4$=CH$_3$.

Prepared in analogous manner to Example 1 replacing 5-aminoisophthalic acid by 3-aminobenzoic acid.

EXAMPLE 4

Preparation of a dye of Formula (6) in which n=1, $R_6$=4-COOH, $R_7$=SO$_3$H, y=2, $R_3$ and $R_4$=CH$_3$.

Prepared in analogous manner to Example 1 replacing 5-aminoisophthalic acid by 4-aminobenzoic acid.

Ink compositions of the ammonium salts of the above dyes were prepared by dissolving 2 parts of the dye in 98 parts of a 90:10 mixture of water and 2-pyrrolidone. The ink compositions were printed onto plain paper using a thermal ink-jet printer to give black prints which had good optical density and lightfastness.

EXAMPLE 5 -Inks

The inks described in Tables I and II may be prepared wherein the Dye described in the first column is the Dye made in the above example of the same number. Numbers quoted in the second column onwards refer to the number of parts of the relevant ingredient and all parts are by weight. The inks may be applied to paper by thermal or piezo ink jet printing.

The following abbreviations are used in Table I and II:
PG=propylene glycol
DEG=diethylene glycol
DEG-mme=diethylene glycol monomethylether
NMP=N-methyl pyrollidone
DMK=dimethylketone
IPA=isopropanol
MEOH=methanol
2P=2-pyrollidone
MIBK=methylisobutyl ketone
P15=pentane=1,5-diol
BDL=butane-2,3-diol
CET=cetyl ammonium bromide
PHO=Na$_2$HPO$_4$
TBT=tertiary butanol and
TDG=thiodiglycol

TABLE I

| Dye | Dye Content | Water | PG | DEG-mme | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 2 | 3.1 | 86 | 5 | | | | | 0.2 | 4 | | | 5 |
| 1 | 1.1 | 81 | | | 9 | | 0.5 | 0.5 | | | 9 | |
| 2 | 2.5 | 60 | 4 | 15 | 3 | 3 | | | 6 | 10 | 5 | 4 |
| 3 | 5 | 65 | | 20 | | | | | 10 | | | |
| 4 | 2.4 | 75 | 5 | 4 | | 5 | | | | 6 | | 5 |
| 2 | 4.1 | 80 | 3 | 5 | 2 | 10 | | 0.3 | | | | |
| 3 | 3.2 | 65 | | 5 | 4 | 6 | | | 5 | 4 | 6 | 5 |
| 4 | 5.1 | 96 | | | | | | | | 4 | | |
| 3 | 10.8 | 90 | 5 | | | | | | 5 | | | |
| 2 | 10.0 | 80 | 2 | 6 | 2 | 5 | | | 1 | | 4 | |
| 1 | 1.8 | 80 | | 5 | | | | | | | 15 | |
| 1 | 2.6 | 84 | | | 11 | | | | | | 5 | |
| 2 | 3.3 | 80 | 2 | | | 10 | | | | 2 | | 6 |
| 3 | 12.0 | 90 | | | 7 | | 0.3 | | 3 | | | |
| 4 | 5.4 | 69 | 2 | 20 | 2 | 1 | | | | | 3 | 3 |
| 1 | 6.0 | 91 | | | 4 | | | | | | 5 | |

TABLE II

| Dye | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 |  |  | 0.2 |  |  |  |  | 5 |  |
| 4 | 9.0 | 90 |  | 5 |  |  |  |  |  | 1.2 |  | 5 |
| 3 | 1.5 | 85 | 5 | 5 |  | 0.15 | 5.0 | 0.2 |  |  |  |  |
| 4 | 2.5 | 90 |  | 6 | 4 |  |  |  |  | 0.12 |  |  |
| 4 | 3.1 | 82 | 4 | 8 |  | 0.3 |  |  |  |  |  | 6 |
| 4 | 0.9 | 85 |  | 10 |  |  |  |  | 5 | 0.2 |  |  |
| 3 | 8.0 | 90 |  | 5 | 5 |  |  | 0.3 |  |  |  |  |
| 2 | 4.0 | 70 |  | 10 | 4 |  |  |  | 1 |  | 4 | 11 |
| 1 | 2.2 | 75 | 4 | 10 | 3 |  |  |  | 2 |  | 6 |  |
| 1 | 10.0 | 91 |  |  | 6 |  |  |  |  |  | 3 |  |
| 1 | 9.0 | 76 |  | 9 | 7 |  | 3.0 |  |  | 0.95 | 5 |  |
| 2 | 5.0 | 78 | 5 | 11 |  |  |  |  |  |  | 6 |  |
| 3 | 5.4 | 86 |  |  | 7 |  |  |  |  |  | 7 |  |
| 4 | 2.1 | 70 | 5 | 5 | 5 | 0.1 | 0.2 | 0.1 | 5 | 0.1 | 5 |  |
| 3 | 2.0 | 90 |  | 10 |  |  |  |  |  |  |  |  |
| 1 | 2 | 88 |  |  |  |  |  | 10 |  |  |  |  |
| 2 | 5 | 78 |  |  | 5 |  |  | 12 |  |  | 5 |  |
| 1 | 8 | 70 | 2 |  | 8 |  |  | 15 |  |  | 5 |  |
| 1 | 10 | 80 |  |  |  |  |  | 8 |  | 12 |  |  |
| 1 | 10 | 80 |  | 10 |  |  |  |  |  |  |  |  |

We claim:

1. A bisazo dye of Formula (1) and salts thereof:

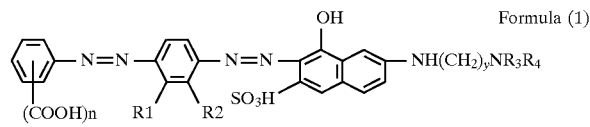

Formula (1)

wherein:

$R_1$ and $R_2$ together with the carbon atoms to which they are attached form a 5- or 6-membered carbocyclic ring which is optionally substituted by $SO_3H$;

$R_3$ and $R_4$ are each independently H or $C_{1-4}$-alkyl;

y is 1, 2, 3 or 4; and n is 1, 2 or 3.

2. A dye according to claim 1 wherein $R_1$ and $R_2$ together with the carbon atoms to which they are attached form a benzene ring which is optionally substituted by $SO_3H$.

3. An ink composition comprising a liquid medium and a dye of Formula (1) or a salt thereof, as defined in claim 1 or claim 2.

4. An ink according to claim 3 wherein the liquid medium comprises a mixture of water and one or more water-soluble organic solvents.

5. An ink according to claim 3 wherein the water-soluble organic solvent is selected from the group consisting of $C_{1-4}$-alkanols, amides, ketone alcohols, ethers, oligo- and poly-alkylene glycols, alkylene glycols and thioglycols containing a $C_2$–$C_6$-alkylene group, polyols, $C_{1-4}$-alkyl-ethers of polyhydric alcohols, heterocyclic ketones and sulphoxides and mixtures thereof.

6. An ink according to claim 3 which contains 2-pyrrolidone, N-methyl-2-pyrrolidone, ethylene glycol, diethylene glycol, triethylene glycol, 2-methoxy-2-ethoxyethanol and/or a polyethylene glycol with a molecular weight of up to 500.

7. An ink according to claim 3 which contains 2-pyrrolidone or N-methylpyrrolidone.

8. A process for printing a substrate with an ink composition comprising forming the ink into small droplets by ejection from a reservoir through a small orifice so that the droplets of ink are directed at a substrate wherein said ink composition comprises at least one dye of Formula (1) or a salt thereof, as defined in claim 1.

9. A paper or an overhead projector slide or textile material printed with an ink composition characterised in that the ink composition comprises at least one dye of Formula (1) or salt thereof, as defined in claim 1.

10. A process for the coloration of a textile material with an ink composition comprising a dye of Formula (1) or a salt thereof, as defined in claim 1, which comprises the steps:

i) applying the ink composition to the textile material by inkjet printing; and ii) heating the textile material at a temperature from 50° C. to 250° C. to fix the dye on the material.

11. A textile material coloured with an ink composition according to claim 4.

12. A textile material coloured by means of the process of claim 10.

* * * * *